US012699810B2

(12) United States Patent
Baek

(10) Patent No.: US 12,699,810 B2
(45) Date of Patent: Aug. 4, 2026

(54) DE-IDENTIFICATION PROCESSING METHOD FOR MANAGEMENT OF PERSONAL IDENTIFICATION INFORMATION AND APPARATUS THEREFOR

(71) Applicant: LEADPOINT SYSTEM INC., Jeonju (KR)

(72) Inventor: Eun Ju Baek, Daejeon (KR)

(73) Assignee: LEADPOINT SYSTEM INC., Jeonju (KR)

( * ) Notice: Subject to any disclaimer, the term of this patent is extended or adjusted under 35 U.S.C. 154(b) by 114 days.

(21) Appl. No.: 18/897,121

(22) Filed: Sep. 26, 2024

(65) Prior Publication Data

US 2025/0021694 A1     Jan. 16, 2025

Related U.S. Application Data

(63) Continuation of application No. PCT/KR2022/004430, filed on Mar. 29, 2022.

(30) Foreign Application Priority Data

Mar. 29, 2022     (KR) ........................ 10-2022-0039004

(51) Int. Cl.
*H04L 9/32* (2006.01)
*G06F 21/62* (2013.01)
(Continued)

(52) U.S. Cl.
CPC ........ *G06F 21/6254* (2013.01); *H04L 9/0869* (2013.01); *H04L 9/3297* (2013.01); *H04L 9/50* (2022.05)

(58) Field of Classification Search
CPC ..... G06F 21/6254; H04L 9/50; H04L 9/0869; H04L 9/3297
See application file for complete search history.

(56) References Cited

U.S. PATENT DOCUMENTS 11,663,510 B1 * 5/2023 Carter, Jr. .............. B82Y 10/00
                                                            257/31
11,895,232 B1 * 2/2024 Stapleton .............. H04L 9/0861
                        (Continued)

FOREIGN PATENT DOCUMENTS

KR     10-2010-0097430 A     9/2010
KR     10-2018-0030971 A     3/2018
                        (Continued)

*Primary Examiner* — Sarah Su
*Assistant Examiner* — Vladimir I Gavrilenko
(74) *Attorney, Agent, or Firm* — Harvest IP Law, LLP

(57) ABSTRACT

A method for operation of a personal identification information processing apparatus, according to an embodiment of the present invention, comprises the steps of: acquiring personal identification information corresponding to personal information; identifying a de-identification mode corresponding to the personal identification information; in correspondence to the personal identification information, processing an iterative hash chain a determined number of times according to the de-identification mode; configuring a relational database by using information regarding the result of the iterative hash chain and the personal identification information; and providing to a target network by replacing the information regarding the result of the iterative hash chain stored in the relational database with de-identification information of the personal identification information.

16 Claims, 9 Drawing Sheets

(51) Int. Cl.
H04L 9/00 (2022.01)
H04L 9/08 (2006.01)

(56) References Cited

U.S. PATENT DOCUMENTS

2013/0159021 A1* 6/2013 Felsher .................. G16H 10/60
705/3
2016/0342812 A1* 11/2016 Lynch ................. H04L 63/0421

FOREIGN PATENT DOCUMENTS

KR 10-2046383 B1 11/2019
KR 10-2021-0045562 A 4/2021

* cited by examiner

FIG. 3

EXEMPLARY CODES OF ITERATIVE HASH CHAIN

```
public static void main (String[] args) throws Exception{
    String ori = "sdfsdfadsafdsafdfdsafdsafdsdsafd23443232rfdsfdsfsdfdsfdsfsdfdsfsfdsfdsfds";
    String a1 = EncryptUtil. encryptSHA256 (ori);
    String a2 = EncryptUtil. encryptSHA256 (a1);
    String a3 = EncryptUtil. encryptSHA256 (a2);
    String a4 = EncryptUtil. encryptSHA256 (a3);
    String a5 = EncryptUtil. encryptSHA256 (a4);

System. out. println( "ori>>" +ori);
    System. out. println( "1 >>" +a1);
    System. out. println( "2 >>" +a2);
    System. out. println( "3 >>" +a3);
    System. out. println( "4 >>" +a4);
}
```

EXEMPLARY RESULT OF ITERATIVE HASH CHAIN

```
Ori >> sdfsdfadsafdsafdfdsafdsafdsdsafd23443232rfdsfdsfsdfdsfdsfsdfdsfsfdsfdsfds
1 >> 1913c90672ac9dd807998c9fc90a5ac320b370573ec65234ef86c8ec45df56e4
2 >> 7779fef8c480c14b203306c17419ecc1d4d5768c80a17c6c31a0cb76abc07ac0
3 >> b680ef3dd947271a26334f11a1695b224d16be88e5e85d71cd336717a7de5ada
4 >> 4aaf871a2a1b0f1761f118cc7288556a10235394c296464c166621bd824081d3
```

FIG. 4

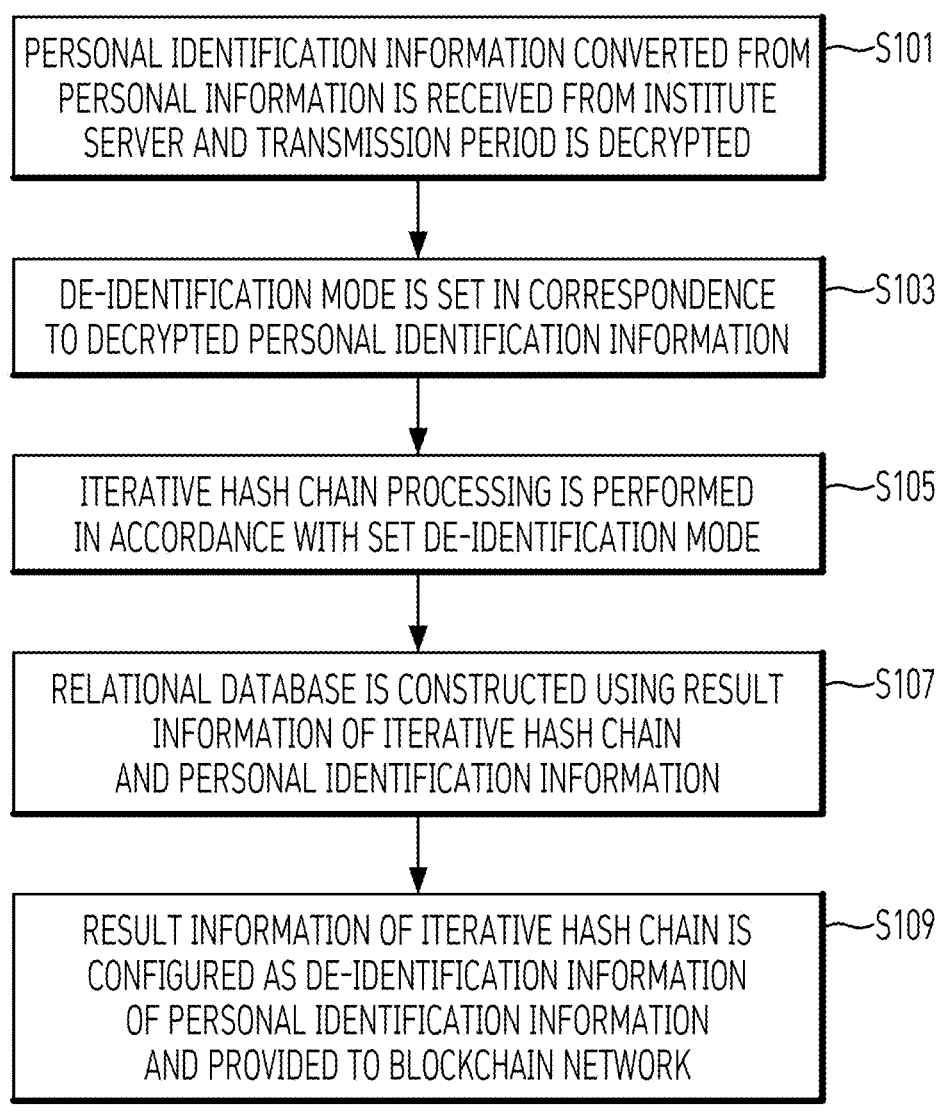

PERSONAL IDENTIFICATION INFORMATION CONVERTED FROM PERSONAL INFORMATION IS RECEIVED FROM INSTITUTE SERVER AND TRANSMISSION PERIOD IS DECRYPTED ~S101

DE-IDENTIFICATION MODE IS SET IN CORRESPONDENCE TO DECRYPTED PERSONAL IDENTIFICATION INFORMATION ~S103

ITERATIVE HASH CHAIN PROCESSING IS PERFORMED IN ACCORDANCE WITH SET DE-IDENTIFICATION MODE ~S105

RELATIONAL DATABASE IS CONSTRUCTED USING RESULT INFORMATION OF ITERATIVE HASH CHAIN AND PERSONAL IDENTIFICATION INFORMATION ~S107

RESULT INFORMATION OF ITERATIVE HASH CHAIN IS CONFIGURED AS DE-IDENTIFICATION INFORMATION OF PERSONAL IDENTIFICATION INFORMATION AND PROVIDED TO BLOCKCHAIN NETWORK ~S109

NUMERIC VALUE OF STRING IS EXTRACTED FROM
PERSONAL IDENTIFICATION INFORMATION
AND IS CONCATENATED ~S1031

FIRST DIGIT NUMBER AND LAST DIGIT NUMBER
OF CONCATENATED STRING ARE SUMMED ~S1032

ITERATIVE HASH CHAIN PROCESSING IS
PERFORMED BY UNITS DIGIT OF SUMMED VALUE ~S1033

FIG. 8

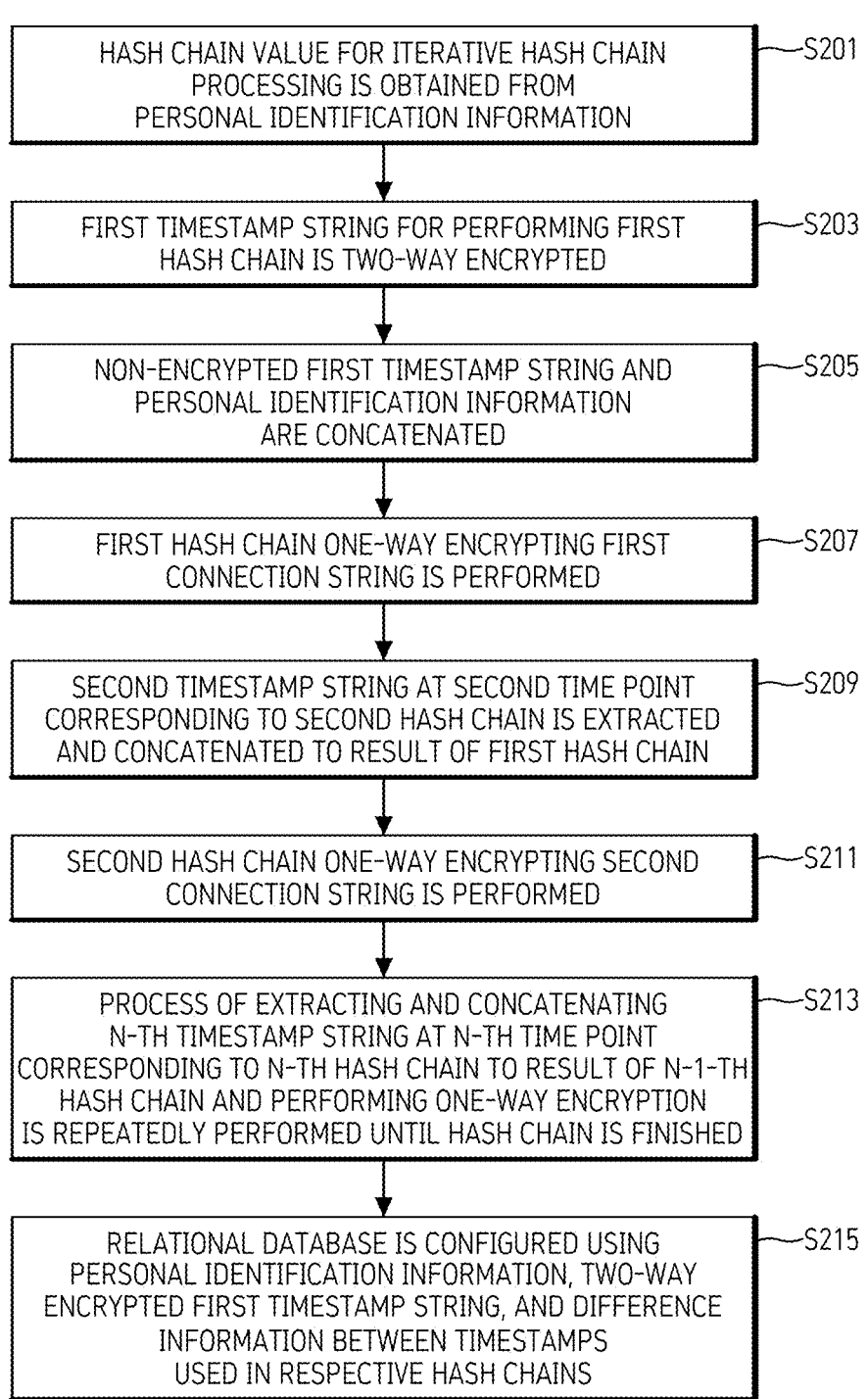

| | |
|---|---|
| HASH CHAIN VALUE FOR ITERATIVE HASH CHAIN PROCESSING IS OBTAINED FROM PERSONAL IDENTIFICATION INFORMATION | S201 |
| FIRST TIMESTAMP STRING FOR PERFORMING FIRST HASH CHAIN IS TWO-WAY ENCRYPTED | S203 |
| NON-ENCRYPTED FIRST TIMESTAMP STRING AND PERSONAL IDENTIFICATION INFORMATION ARE CONCATENATED | S205 |
| FIRST HASH CHAIN ONE-WAY ENCRYPTING FIRST CONNECTION STRING IS PERFORMED | S207 |
| SECOND TIMESTAMP STRING AT SECOND TIME POINT CORRESPONDING TO SECOND HASH CHAIN IS EXTRACTED AND CONCATENATED TO RESULT OF FIRST HASH CHAIN | S209 |
| SECOND HASH CHAIN ONE-WAY ENCRYPTING SECOND CONNECTION STRING IS PERFORMED | S211 |
| PROCESS OF EXTRACTING AND CONCATENATING N-TH TIMESTAMP STRING AT N-TH TIME POINT CORRESPONDING TO N-TH HASH CHAIN TO RESULT OF N-1-TH HASH CHAIN AND PERFORMING ONE-WAY ENCRYPTION IS REPEATEDLY PERFORMED UNTIL HASH CHAIN IS FINISHED | S213 |
| RELATIONAL DATABASE IS CONFIGURED USING PERSONAL IDENTIFICATION INFORMATION, TWO-WAY ENCRYPTED FIRST TIMESTAMP STRING, AND DIFFERENCE INFORMATION BETWEEN TIMESTAMPS USED IN RESPECTIVE HASH CHAINS | S215 |

FIG. 9

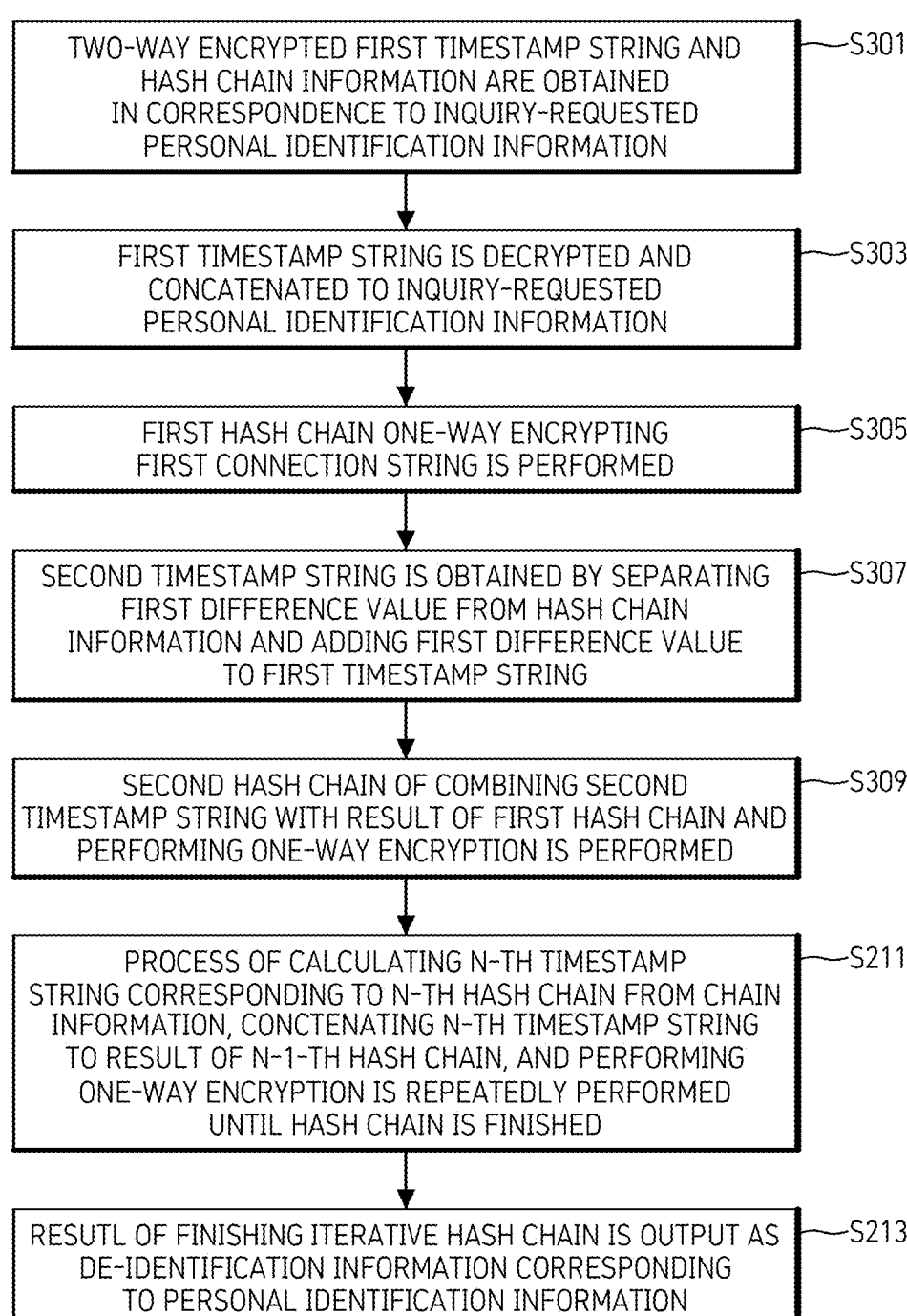

TWO-WAY ENCRYPTED FIRST TIMESTAMP STRING AND
HASH CHAIN INFORMATION ARE OBTAINED
IN CORRESPONDENCE TO INQUIRY-REQUESTED
PERSONAL IDENTIFICATION INFORMATION — S301

FIRST TIMESTAMP STRING IS DECRYPTED AND
CONCATENATED TO INQUIRY-REQUESTED
PERSONAL IDENTIFICATION INFORMATION — S303

FIRST HASH CHAIN ONE-WAY ENCRYPTING
FIRST CONNECTION STRING IS PERFORMED — S305

SECOND TIMESTAMP STRING IS OBTAINED BY SEPARATING
FIRST DIFFERENCE VALUE FROM HASH CHAIN
INFORMATION AND ADDING FIRST DIFFERENCE VALUE
TO FIRST TIMESTAMP STRING — S307

SECOND HASH CHAIN OF COMBINING SECOND
TIMESTAMP STRING WITH RESULT OF FIRST HASH CHAIN AND
PERFORMING ONE-WAY ENCRYPTION IS PERFORMED — S309

PROCESS OF CALCULATING N-TH TIMESTAMP
STRING CORRESPONDING TO N-TH HASH CHAIN FROM CHAIN
INFORMATION, CONCTENATING N-TH TIMESTAMP STRING
TO RESULT OF N-1-TH HASH CHAIN, AND PERFORMING
ONE-WAY ENCRYPTION IS REPEATEDLY PERFORMED
UNTIL HASH CHAIN IS FINISHED — S211

RESUTL OF FINISHING ITERATIVE HASH CHAIN IS OUTPUT AS
DE-IDENTIFICATION INFORMATION CORRESPONDING
TO PERSONAL IDENTIFICATION INFORMATION — S213

DE-IDENTIFICATION PROCESSING METHOD FOR MANAGEMENT OF PERSONAL IDENTIFICATION INFORMATION AND APPARATUS THEREFOR

TECHNICAL FIELD

The present disclosure relates to a de-identification processing method and apparatus. In more detail, the present disclosure relates to a de-identification processing method for management of personally identifiable information, and an apparatus therefor.

RELATED ART

In modern society, information about specific individuals can be obtained from numerous organizations. Health, financial, and commercial organizations such as hospitals, research institutes, banks, insurance companies, and retailers own data that is available for research and development, marketing, and other commercial purposes. However, there is a growing awareness of the need to protect the privacy of individuals related to this data.

However, due to the advancement of computer technology, personal information that is stored is being publicly leaked through crimes such as hacking, and is being misused for other crimes. In particular, recently, methods of encrypting and using personal information as personal identification information through one-way hash algorithms are used, but, with the advancement of computer performance and hacking techniques, it is anticipated that one-dimensional hash algorithm security may be disabled.

Nevertheless, the need to analyze and manage such information is growing due to the recent emergence of technologies related to big data and blockchain.

In particular, blockchain technology has reached a sufficient level of maturity and has become widely adopted across various industries and industrial settings utilizing related technologies have also rapidly changed, so improved technologies based on blockchain are actively playing a role in various sectors of society. Accordingly, the risk of personal information leakage through blockchain is also increasing.

Further, utilization of personal information in a blockchain environment is very limited because, once personal information is exposed in a blockchain network, it becomes virtually impossible to delete it permanently. As a result, related businesses have also struggled to develop smoothly.

DISCLOSURE

Technical Problem

The present disclosure has been made in an effort to solve the problems described above and an objective of the present disclosure is to provide a de-identification processing method and apparatus that enables a personalized service while preventing personal identification information from being easily exposed by performing de-identification processing that corresponds to personal identification information obtained by converting personal information and by constructing a relational database that can map and manage personal information using the de-identified de-identification code information such that a personal customized service based on a network using the de-identification code information can be provided.

Technical Solution

In order to achieve the objectives described above, an embodiment of the present disclosure provides an operation method of a de-identification service provision apparatus for management of personal identification information, the operation method including: obtaining personal identification information converted from personal information; identifying a de-identification mode corresponding to the personal identification information; performing iterative hash chain processing by the number of times determined in accordance with the de-identification mode in correspondence to the personal identification information; configuring a relational database corresponding to the personal identification information using de-identification code information obtained as a result of the iterative hash chain processing; and replacing de-identification code information stored in the relational database with de-identification information of the personal identification information and providing the de-identification information to a target network.

In order to achieve the objectives described above, an apparatus according to an embodiment of the present disclosure is a de-identification service provision apparatus and the apparatus includes: a personal identification information collector configured to obtain personal identification information converted from personal information; an iterative hash chain processor configured to identify a de-identification mode corresponding to the personal identification information and perform iterative hash chain processing by the number of times determined in accordance with the de-identification mode in correspondence to the personal identification information; a database manager configured to configure a relational database corresponding to the personal identification information using de-identification code information obtained as a result of the iterative hash chain processing; and a service processor configured to replace de-identification code information stored in the relational database with de-identification information of the personal identification information, and provide the de-identification information to a target network.

Advantageous Effects

According to an embodiment of the present disclosure, since iterative hash chain processing is performed by the number of times determined in accordance with a de-identified mode in correspondence to personal identification information and a relational database is configured using result information of the iterative hash chain and the personal identification information, it is possible to replace the result information of an iterative hash chain stored in the relational database with de-identification information of the personal identification information and provide the de-identification information to a target network.

Therefore, the present disclosure performs processing such that personal customized services based on various networks such as a blockchain network using de-identification code information can be provided, thereby being able to provide de-identification processing method and apparatus that enables network-based personalized services while preventing personal identification information from being exposed.

BRIEF DESCRIPTION OF DRAWINGS

FIG. 3 is a diagram showing exemplary codes of an iterative hash chain and a performance result according to an embodiment of the present disclosure.

FIG. 4 is a flowchart illustrating the operation of the de-identification service provision apparatus according to an embodiment of the present disclosure.

FIG. 8 is a flowchart illustrating a de-identification processing operation of a de-identification service provision apparatus according to another embodiment of the present disclosure.

FIG. 9 is a flowchart illustrating a de-identification information inquiry operation of a de-identification service provision apparatus according to another embodiment of the present disclosure.

MODE FOR INVENTION

The followings provide only the principle of the present disclosure. Accordingly, those skilled in the art may implement the principle of the present disclosure and various apparatuses included in the concept and range of the present disclosure which are not clearly described or shown herein though. All conditional terminologies and embodiments described herein should be understood as being definitely intended as an object for understanding the concept of the present disclosure without limiting the specifically stated embodiments and states.

Further, all detailed descriptions enumerate not only the principle, aspects, and embodiments of the present disclosure, but specific embodiments should be understood as being intended to include structural and functional equivalents of those matters. Further, these equivalents should be understood as including all elements designed to perform the same functions regardless of not only equivalents known at present, but equivalents, that is, structures to be developed in the future.

Accordingly, for example, block diagrams of this specification should be understood as showing an exemplary conceptual respect that concretes the principle of the present disclosure. Similarly, all of flowcharts, state conversion diagrams, intention codes, etc. should be understood as showing various processes that can be substantially shown on computer-readable media and are performed by computers and processors regardless of whether a computer or a processor is definitely shown.

Further, definite use of terms proposed as a processor, control, or similar concepts should not be construed by exclusively ability to execute software and should be construed as suggestively including digital signal processor (DSP) hardware, and a ROM, a RAM, and a nonvolatile memory for software without limitation. Other hardware well known in the art may also be included.

The objectives, features, and advantages of the present disclosure described above will be clearer through the following detailed description relating to the accompanying drawing, so the spirit of the present disclosure would be easily implemented by those skilled in the art. Further, in description of the present disclosure, well-known technologies are not described in detail not to unnecessarily obscure the subject of the present disclosure.

Hereinafter, an exemplary embodiment of the present disclosure is described in detail with reference to the accompanying drawings.

Figure 1:
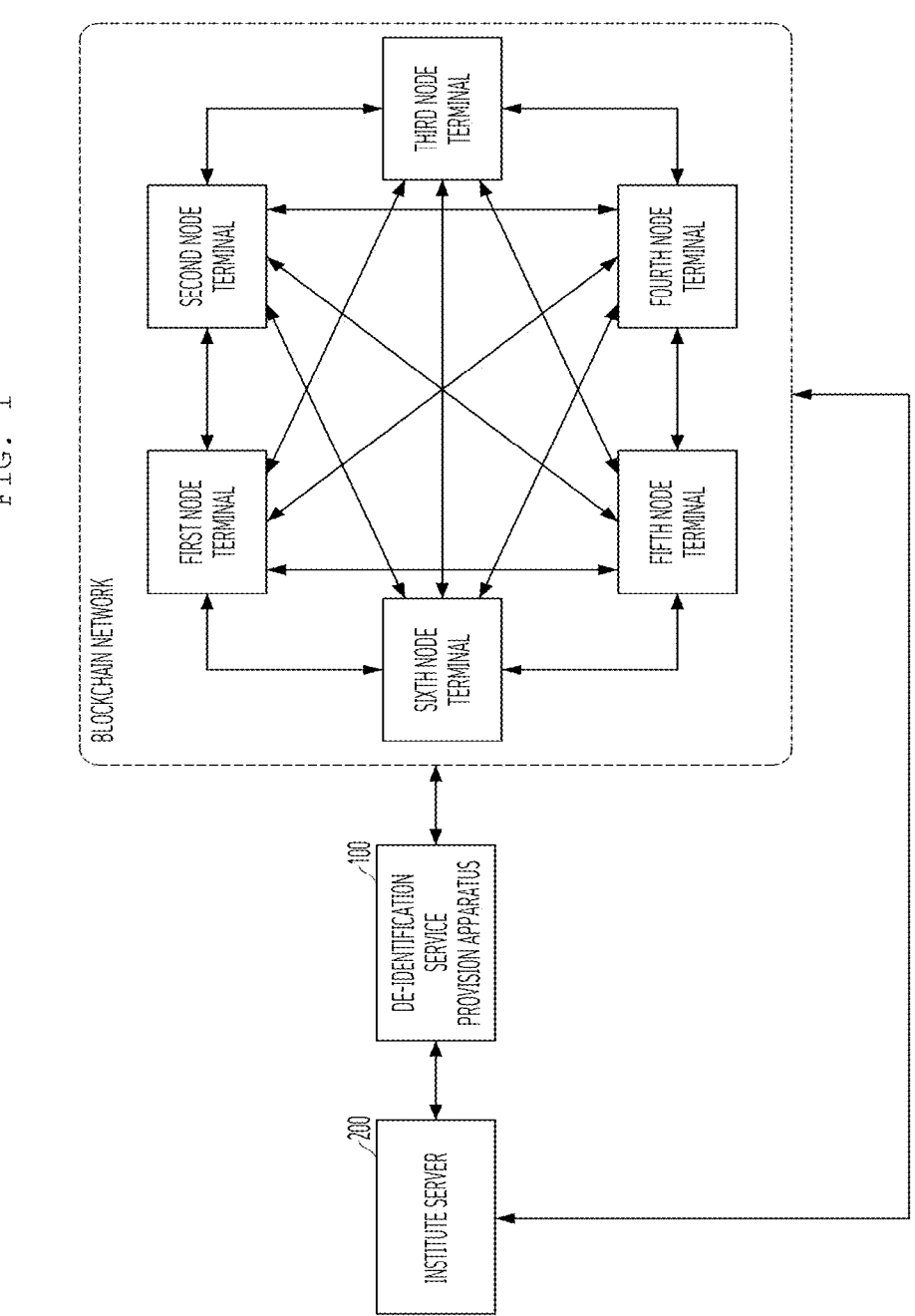
FIG. 1 is a conceptual diagram schematically showing the entire system according to an embodiment of the present disclosure.

FIG. 1 is a diagram schematically showing the entire system according to an embodiment of the present disclosure.

First, referring to FIG. 1, the entire system according to an embodiment of the present disclosure includes a de-identification service provision apparatus 100 and an institution server 200. The de-identification service provision apparatus 100 and the institution server 200 can construct data connection channels through individual wired/wireless networks and each of the channels may be configured as a transmission encryption channel that transmits/receives personalization identifiable information, etc. through a secured network.

In this configuration, the network may be implemented as all kinds of wired/wireless networks such as a Local Area Network (LAN), a Wide Area Network (WAN), a Value Added Network (VAN), a Personal Area Network (PAN), a mobile radio communication network, or a satellite communication network.

Further, the institute server 200 may be a server of an institute equipped with a database that stores and manages personal information and personal identification information converted from personal information, and for example, a personal information application server, a public data server, a medical system server, etc. that provide a personalization service using personal information may be exemplified.

According to the related art including such institute server 200, even though personal information such as a resident registration number is converted and managed into personal identification information through one-way hash conversion, the personal identification information is difficult to securely manage due to its inferential nature, so it is practically use personal impossible to use personal identification information in order to use services based on blockchain networks in which data is permanently preserved.

According to an embodiment of the present disclosure for solving this problem, the de-identification service provision apparatus 100 can provide a de-identification processing relay service that performs a specific de-identification identification service processing using personal identification information processed by the institute server 200, replaces the de-identified de-identification code information with de-identification information of the personal identification information, and provides the de-identification information to a target network.

Further, the de-identification service provision apparatus 100 constructs a relational database with personal identification information that is obtained in such de-identification process, thereby being able to perform an intermediate process that enables an institute service based on personal information that is processed by the institute server 200 to be smoothly performed through a target network such as a blockchain network.

To this end, the de-identification service provision apparatus 100 according to an embodiment of the present disclosure, first, receives the personal identification information converted from personal information and having an encrypted transmission period from the institute server 200.

For example, the de-identification service provision apparatus 100 can obtain complete personal identification information by performing transmission period encryption on the received personal identification information.

In this case, conversion into personal identification information corresponding to the personal information may exemplify primary hash conversion having unidirectionality and is performed by the institute server 200 itself, so mapping information can be stored and managed in a database of the institute server 200.

Further, the de-identification service provision apparatus 100 identifies a de-identification mode corresponding to the personal identification information and perform iterative hash chain processing by the number of times determined in accordance with the de-identification information in correspondence to the personal identification information.

Accordingly, the de-identification service provision apparatus 100 configures a relational database corresponding to the personal identification information and configured to be able to replace the personal identification information using de-identification code information that is result information of the iterative hash chain, and provides de-identification code information that is result information of an iterative hash chain stored in the relational database to a target network as de-identification information of the personal identification information.

In more detail, the de-identification service provision apparatus 100 can replace the personal identification information transmitted from the institute server 200 with the de-identification information, can perform transmission period encryption on the de-identification information, and can propagate the transmission period-encrypted de-identification information to a blockchain network connected with the institute server.

In this case, the iterative hash chain processing may include processing that repeatedly and serially performs a preset N-th hash encryption conversion in correspondence to personal identification information or data with a special string added to the personal identification information.

In this case, the number of repetitions or iteration time of the N-th hash conversion may be differently determined, depending on each personal identification information and timestamp, and due to such variable setting of the number of repetitions, it becomes almost impossible to infer personal identification data and security can be greatly improved.

Due to the service process of the de-identification service provision apparatus 100, even though the institute server 200 uses existing personal identification information itself without a specific additional configuration, it can provide personal information services of various institutes based on a blockchain network or various similar data permanent preservation network, and it becomes easy to develop application software that supports various types of personal information processing based on the services.

Meanwhile, as shown in FIG. 1, the institute server 200 and the de-identification service provision apparatus 100 can be connected to a blockchain network of a mesh-type network topology by one or more node terminals connected through a wired or wireless network. The node terminals are connected to the blockchain network through I/O devices and can exchange data. The blockchain network system according to an embodiment of the present disclosure may include, as the node terminals, various electronic systems such as mobile devices including a mobile phone, a smartphone, a PDA, a table computer, a laptop, etc., computing devices including a personal computer, a tablet computer, a netbook, etc., or electronic products including a television, a smart television, a security device for gate control, etc.

Further, each of the node terminals can register account information according to its node connection in transaction ledger data that is shared in a cloud manner through a network. Further, when there is a need for a transaction of encryption information for creating a blockchain, each trader terminal can propagate transaction information to be recorded in the transaction ledger data to every trader terminals.

Further, the transaction ledger data is updated and the information thereof is shared in accordance with mutual verification processing corresponding to the above process, whereby a transaction of encryption information for creating a blockchain can be made.

In this case, the transaction ledger data can be linked with blockchain data having a structure in which a plurality of blocks is sequentially connected in order of creation by making a current block include the hash value of a previously created block for blocks each of corresponding to predetermined times or units. Accordingly, it is possible to easily verify whether the transaction ledger data has been tampered by verifying the hash value of the blockchain.

Security stability of such blockchain can be made by participation in the system of sharers who share data. Accordingly, transaction information blocks, which include specifications of sharing between sharer terminals connected to the blockchain network, specifications of issuance/transaction of encryption information for creating the blockchain, etc., can be sequentially stored, and transaction verification processing for sequentially making hash values for anti-tempering thereof into a blockchain can be distributionally performed at the trader terminals.

Further, de-identification information propagated and shared through such block chain network can be configured as string code information that has undergone iterative hash chain processing by a preset number of repetitions, and there is an effect that even though such de-identification information is permanently shared, it is impossible to infer the original personal identification information without the relational database and the service process constructed in the de-identification service provision apparatus 100.

Figure 2:
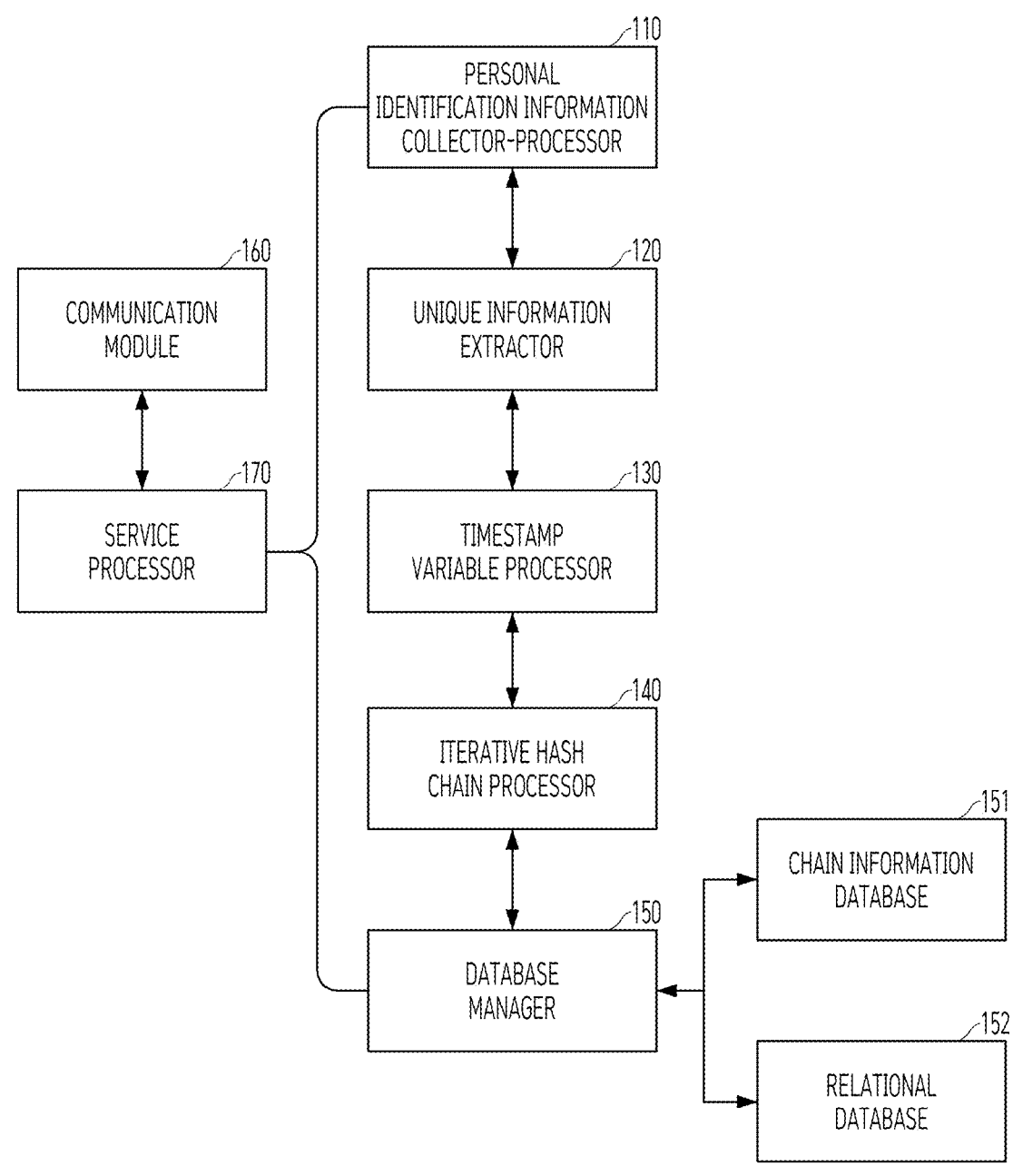
FIG. 2 is a block diagram more specifically showing a de-identification service provision apparatus according to an embodiment of the present disclosure.

FIG. 2 is a block diagram more specifically showing a de-identification service provision apparatus according to an embodiment of the present disclosure.

Referring to FIG. 1, the de-identification service provision apparatus 100 according to an embodiment of the present disclosure may be implemented as one or more processors based on a computer and includes a communication module 160 that is driven by a service processor 170, a personal identification information collector-processor 110, a unique information extractor 120, a timestamp variable processor 130, an iterative hash chain processor 140, and a database manager 150.

The communication module 160 may include one or more communication modules that enable wired/wireless communication between the de-identification service provision apparatus 100 and a communication system including an internet network, between the de-identification service provision apparatus 100 and a network in which the institute server 200 is positioned, or with a blockchain network. For example, the communication unit 120 may include a digital network communication board that encodes and modulates a transmitted signal and demodulates and decodes a received signal, a communication modem, or an RF front end that processes an RF signal.

Further, the service processor performs a general service information processing operation of the de-identification service provision apparatus 100 according to an embodiment of the present disclosure and can perform output and transmission of control orders and an output result corresponding to each processor. The service processor 170 may be implemented as one or more microprocessors for performing control of driving and outputting of the processors or a processor device equipped with a program for performing the control.

The personal identification information collector-processor 110 obtains personal identification information converted from personal information from the institute server 200.

The personal identification information collector-processor 110 can receive the personal identification information one-way converted with the transmission period encrypted from the personal information from the institute server 200 and can obtain the personal identification information by decrypting the received identification information with a preset transmission period decryption key.

For example, personal identification information may include identification information not only a resident registration number string composed of numbers like XXXXXX-XXXXXXX, but identification information obtained through one-way hash conversion such as '7DSFVDFF9877128DVDSF'.

Further, the iterative hash chain processor 140 identifies a de-identification mode corresponding to the personal identification information and performs iterative hash chain processing by the number of times determined in accordance with the de-identification mode, thereby being able to obtain a processing result.

In this case, the de-identification mode may be individually set in accordance with the type of each personal identification information or a request from the institute server 200, and the iterative hash chain processor 140 can obtain unique information of timestamp variable information from the unique information extractor 120 or the timestamp variable processor 130 and can repeatedly perform hash processing on the personal identification information or a string in which the personal identification information and a special string are combined, by a predetermined number of repetitions in accordance with the unique information of the timestamp variable information.

In more detail, the de-identification mode may include at least one of a first mode that calculates the number of repetitions of the iterative hash chain processing on the basis string information of the personal identification information, a second mode that calculates the number of repetitions of the iterative hash chain processing using a timestamp corresponding to the personal identification information as a random seed, and a third mode that calculates the number of repetitions of the iterative hash chain processing using of timestamp processing a string the corresponding to the personal identification information.

In this case, the de-identification mode may be set as a composite mode in which at least one of the first mode, the second mode, and the third mode is sequentially performed. For example, iterative hash processing may be further performed by the second mode after iterative hash chain processing is performed by the first mode in correspondence to the same personal identification information. In this case, the de-identification mode may be set as a composite mode in which the first mode and the second mode are continuously performed.

In more detail, when the de-identification mode is identified as the first mode, the iterative hash chain processor 140 can extract and concatenate numeric values of the string of the personal identification information from the unique information extractor 120.

For example, the concatenated unique information string may be configured as '79877128' from personal identification information such as '7DSFVDFF9877128DVDSF' described above.

Further, the iterative hash chain processor 140 can sum the first number and the last number of the unique information string in the first mode and can output the unit digit of the summed value as the number of repetitions. For example, the sum of the first number and the last number of '79877128' may be '15' and '5' that is the units digit may be output as the number of repetitions.

Accordingly, the iterative hash chain processor 140 serially performs iterative hash chain processing on personal identification information or a string in which the personal identification information and a special string such as unique information are combined, by 5 times output as the number of repetitions, thereby being able to obtain an iterative hash-converted result string.

Meanwhile, when the de-identification mode is identified as the second mode, the iterative hash chain processor 140 may create a timestamp that is obtained from the timestamp variable processor 130 in correspondence to the personal identification information, and may determine a random value determined within a predetermined range as the number of repetitions of the iterative hash chain processing using the timestamp as a seed.

For example, the iterative hash chain processor 140 may determine a random value determined within a preset range (e.g., 2 to 100, etc.) as the number of repetitions of the iterative hash chain processing using a timestamp string (e.g., 1570520287, etc.) obtained from a JAVA system, etc. as a seed. In this case, the predetermined range may be a range set in advance in the de-identification service provision apparatus 100 in consideration of system performance, security, etc., and one repetition, etc. may still allow for the possibility of inference, so the number of repetitions may be set as 5 or more times.

Meanwhile, when the de-identification mode is identified as the third mode, the iterative hash chain processor 140 may extract a timestamp string corresponding to the personal identification information from the timestamp variable processor 130, combine the last number obtained from the timestamp string with the personal identification information, and perform the iterative hash chain processing by a predetermined number of repetitions using the personal identification information combined with the last number.

In more detail, for example, the iterative hash chain processor 140 can extract the last digit number '7' as a special string from a timestamp string (e.g., 1570520287, etc.) at a time at which de-identification point corresponding to personal identification information is performed.

Further, the iterative hash chain processor 140 may configure '7DSFVDFF9877128DVDSF7' by combining personal identification information such as '7DSFVDFF9877128DVDSF' described above with '7' as a string and may perform the iterative hash chain processing by a preset number of times in correspondence to the configured string. The preset number of times may be a random value or a fixed number of repetitions in a preset range (e.g., 2 to 100, etc.).

Meanwhile, the database manager 150 stores and manages de-identified code information that undergoes iterative hash chain processing and is output from the iterative hash chain processor 140, and can provide the de-identified de-identification code information to a target network through the communication module 160 in accordance with control by the service processor 170. The target network may be the blockchain network described above and the de-identified code information may be processed as specific code information replacing personalized identifiable information and may be shared by node devices that perform various personal information-based applications.

To this end, the database manager 150 can store and manage iterative hash chain processing information corresponding to de-identification information through a chain information database 151. In this case, the hash chain information may be de-identification mode information corresponding to de-identified code information.

Further, the database manager 150 can store and manage de-identification code information output through the iterative hash chain processor 140 and relation information related to personal identification information through a relational database 152.

The relational database 152 can define, map, store, and manage an iterative hash chain relationship, which is the correlation between de-identification code information and personal identification information, as a mathematic logic relationship in accordance with control by the database manager 150, and can convert and output de-identification code information corresponding to certain personal identification information according to a request of the service processor 170.

For example, the relational database 152 can perform de-identification code searching on specific personal identification information requested from the service processor 170. When a de-identification code is searched from a database in which it is stored in advance and managed, the service processor 170 outputs the de-identification code information so that personal information can be verified or authenticated even without specifically checking personally identifiable information.

For example, the service processor 170 can obtain hash chain information and a timestamp variable that are mapped and stored in advance in correspondence to personally identifiable information requested to be searched, can perform iterative hash chain processing through the iterative hash chain processor 140, thereby being able to obtain a de-identification code to be searched.

Further, the service processor 170 can output the de-identification code to a device requested to search or can check whether the de-identification code is stored in a specific database and output the result.

Accordingly, the relation information between pre-processed personal identification information and a de-identification code that is a processing result of the iterative hash chain processor 140 is verified even through the content of personal identification information is not checked, so whether requested personal identification information exists and its authenticity can be indirectly verified.

Meanwhile, the service processor 170 may replace the personal identification information transmitted from the institute server 200 with the de-identification information, encrypt a transmission period, and propagate the transmission period-encrypted de-identification information a to blockchain network connected with the institute server 200, etc. through the communication module.

FIG. 3 is a diagram showing exemplary codes of an iterative hash chain and a performance result according to an embodiment of the present disclosure.

Referring to FIG. 3, FIG. 3 exemplifies codes for an iterative hash chain process in a first mode, in which basic personalized identifiable information may be configured by a string "sdfsdfadsafdsafdfdsafdsafdsdsafd23443232rfdsfdsfsdfdsfdsfs dfdsfsfdsfdsfds".

Further, the number of repetitions in the iterative hash chain processor 140 according to an embodiment of the present disclosure may be determined as "5". Such number of repetitions and de-identification code mapping information can be separately stored and managed in the chain information database 151.

Further, as shown in FIG. 3, a1 can be obtained by inputting a basic variable ori that is the result of performing primary hash processing on personalized identifiable information ori and secondarily applying the result to an SHA256 hash function, a2 can be obtained by thirdly applying the result again to the SHA 256 hash function, a3 can be obtained by fourthly applying the result again to the SHA 256 hash function, and a4 can be obtained by fifthly applying the result again to the SHA 256 hash function.

Accordingly, as exemplified in FIG. 3, the result value that has undergone hash chain conversion for four times can be finally stored and managed as de-identification information corresponding to the personalized identifiable information.

FIG. 4 is a flowchart illustrating the operation of the de-identification service provision apparatus according to an embodiment of the present disclosure.

Referring to FIG. 4, the de-identification service provision apparatus 100 receives personal identification information converted from personal information from the institute server 200 and performs transmission period decryption processing (S101).

Further, the de-identification service provision apparatus 100 sets a de-identification mode in correspondence to the decrypted personal identification information (S103).

Thereafter, the de-identification service provision apparatus 100 performs iterative hash chain processing in accordance with the set de-identification mode (S105).

Further, the de-identification service provision apparatus 100 constructs a relational database using result information of the iterative hash chain and the personal identification information (S107).

Thereafter, the de-identification service provision apparatus 100 configures result information of an iterative hash chain as de-identification code information of the personal identification information and provides the de-identification code information to a blockchain network (S109).

Figure 5:
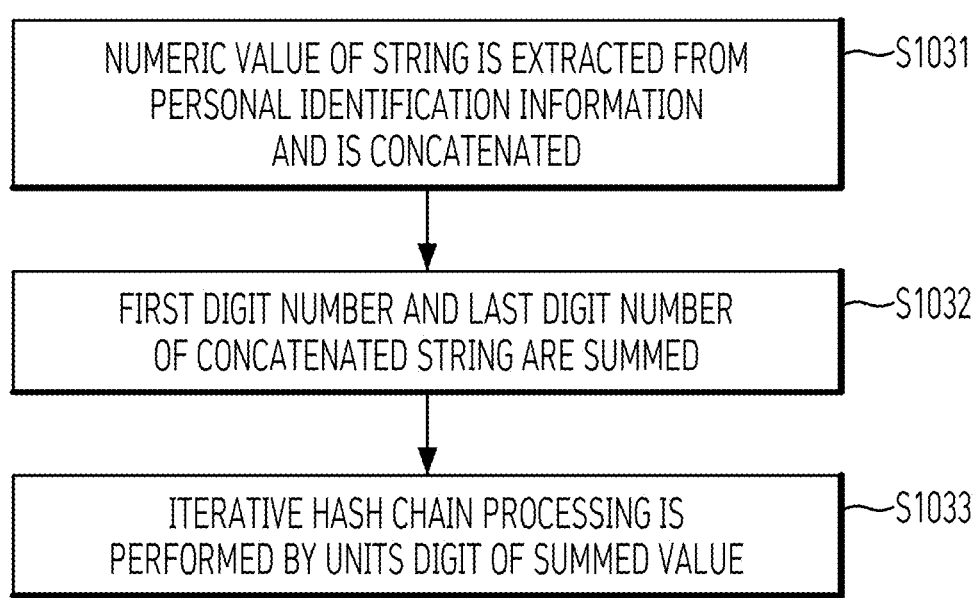
FIGS. 5 to 7 are flowcharts illustrating the detailed operation of the de-identification service provision apparatus in each de-identification mode.
Figure 6:
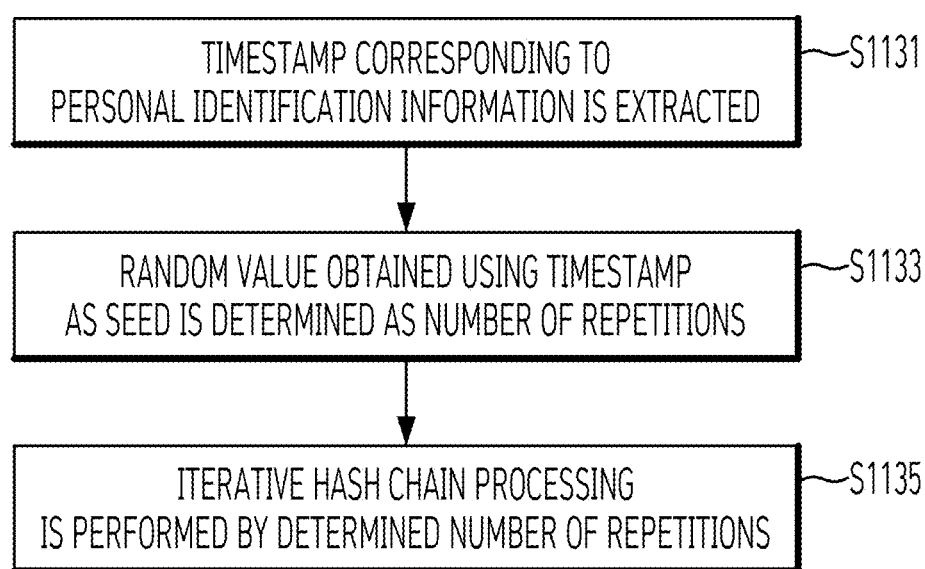
Figure 7:
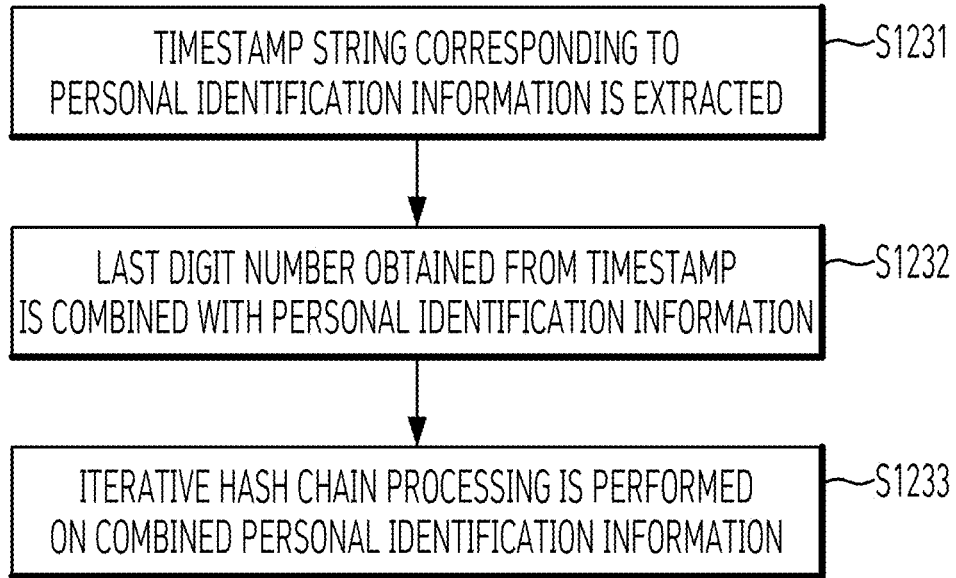

FIGS. 5 to 7 are flowcharts illustrating the detailed operation of the de-identification service provision system in each de-identification mode.

First, FIG. 5 shows the detailed operation of the de-identification service provision apparatus that corresponds to a first mode and the first mode may be a mode that calculates the number of repetitions of the iterative hash chain processing on the basis of string information of the personal identification information.

In the first mode, first, when the de-identification mode is identified as the first mode, the de-identification service provision apparatus 100 extracts and concatenates numeric values of the string of the personal identification information (S1031).

Further, the de-identification service provision apparatus 100 sums the first number and the last number of the concatenated string (S1032).

Thereafter, the de-identification service provision apparatus 100 calculates the unit digit of the summed value as the number of repetitions (S1033).

Accordingly, steps S105 to S109 described above can be sequentially performed in accordance with the calculated number of repetitions.

Meanwhile, FIG. 6 shows the detailed operation of the de-identification service provision apparatus that corresponds to a second mode and the second mode may be a mode that calculates the number of repetitions of the iterative hash chain processing using a timestamp, which corresponds to the personal identification information, as a random seed.

In the second mode, when the de-identification mode is identified as the second mode, the de-identification service provision apparatus 100 creates or extracts a timestamp corresponding to the personal identification information (S1131).

Further, the de-identification service provision apparatus 100 determines a random value determined within a predetermined range as the number of repetitions of the iterative hash chain processing using the timestamp as a seed (S1133).

Accordingly, the de-identification service provision apparatus 100 controls the iterative hash chain processor 140 such that iterative hash chain processing is performed by the determined number of repetitions (S1135).

Further, FIG. 7 shows the detailed operation of the de-identification service provision apparatus that corresponds to a third mode and the third mode may be a mode that calculates the number of repetitions of the iterative hash chain processing using a processing string of a timestamp that corresponds to the personal identification information.

In the third mode, when the de-identification mode is identified as the third mode, the de-identification service provision apparatus 100 extracts a timestamp string corresponding to the personal identification information (S1231).

Further, the de-identification service provision apparatus 100 extracts the last digit number obtained from the timestamp string as a special string and combines the special string with the personal identification information (S1232).

Thereafter, the de-identification service provision apparatus 100 performs the iterative hash chain processing by a preset number of times using the personal identification information combined with the last digit number (S1233).

FIG. 8 is a flowchart illustrating a de-identification processing operation of a de-identification service provision system according to another embodiment of the present disclosure.

Referring to FIG. 8, the de-identification service provision apparatus 100 according to an embodiment of the present disclosure can extract a timestamp at the time point at which each hash chain is performed, and add the timestamp to a one-way encryption target in each round of iterative hash processing.

The timestamp is changed at every conversion time point, and difference information between the first timestamp string and each timestamp can be stored in the relational database 152.

Accordingly, the service processor 170 can provide a service of outputting a pre-converted de-identified code according to an inquiry request from an external device. That is, the service processor 170 can obtain pre-converted de-identification code information by obtaining hash chain information and timestamp information for obtaining a pre-converted de-identification code in correspondence to personal identification information requested to be inquired and by driving the iterative hash chain processor 140 using the personal identification information requested to be inquired, the hash chain information, and the timestamp information.

For example, an external device connected to a blockchain network, etc. can use such pre-converted de-identification code information instead of personally identifiable information. The external device can request inquiry of personally identifiable information to the de-identification service provision apparatus 100 according to an embodiment of the present disclosure when it is required to inquire the personally identifiable information, and the de-identification service provision apparatus 100 confirms whether the personally identifiable information is converted to match pre-converted de-identification code information or provides the pre-converted de-identification code information to the external device, whereby it is possible to check a usage record of a service that uses de-identification code information corresponding to the personally identifiable information through the external device.

For this processing, referring to FIG. 8, the de-identification service provision apparatus 100 first obtains a hash chain value for iterative hash chain processing from personal identification information (S201).

For example, when personal identification information is 7902161555555, according to the exemplary first mode described above, the de-identification service provision apparatus 100 can obtain '12' by summing the first digit '7' and the last digit '5', and can calculate '2' that is the last number as a hash chain value.

Further, the de-identification service provision apparatus 100 applies a default number of times '3' for iterative hash processing on the basis of the hash chain value '2', whereby the number of times of iterative hash processing can be ultimately determined as '5'.

Thereafter, the de-identification service provision apparatus 100 performs two-way encryption on a first timestamp string for performing a first hash chain (S203).

In this case, the first timestamp string is used as a reference value for determining the timestamp strings of the other rounds, so two-way encryption for storing and restoring in the relational database 152 can be processed in advance. For example, the first timestamp string may be 1570520187 and a value 32VDSFSFSDF9877vD1 obtained by performing two-way encryption on the string can be stored in the relational database 152.

Further, the de-identification service provision apparatus 100 concatenates non-encrypted first timestamp string and personal identification information (S205).

For example, when personal identification information is 7902161555555 (or 7DDD138ABC obtained by hashing it), 79021615555551570520187 (or 7DDD138ABC1570520187) concatenated with the first timestamp string 1570520187 can be configured as a first connection sting.

Thereafter, the de-identification service provision apparatus 100 performs a first hash chain that performs one-way encryption on the concatenated string through the iterative hash chain processor 140.

Further, the de-identification service provision apparatus 100 extracts a second timestamp string at a second time point corresponding to a second hash chain and concatenates the second timestamp string to the result of the first hash chain processing (S209).

For example, the second timestamp string may be 1570520189 increased from the first timestamp string because it is extracted at the second time point.

Accordingly, a second connection string concatenating 1570520189 to the result of the first hash chain can be configured.

Further, the de-identification service provision apparatus 100 performs the second hash chain that performs one-way encryption on the second connection string.

Thereafter, the de-identification service provision apparatus 100 repeats a process of extracting an N-th timestamp string corresponding to an N-th hash chain, concatenating the N-th timestamp string to a result of an N−1-th hash chain, and performing one-way encryption until the hash chain is finished through the iterative hash chain processor 140 (S213).

For example, a third connection string may be configured by concatenating 1570520192 that is a third timestamp at a third time point corresponding to a third hash chain to the result of the second hash chain, and one-way encryption may be performed on the third connection string.

Further, a fourth connection string may be configured by concatenating 1570520195 that is a fourth timestamp at a fourth time point corresponding to a fourth hash chain to the result of the third hash chain, and one-way encryption may be performed on the fourth connection string.

Further, a fifth connection string may be configured by concatenating 1570520199 that is a fifth timestamp at a fifth time point corresponding to a fifth hash chain to the result of the fourth hash chain, and one-way encryption may be performed on the fifth connection string.

When the iterative hash chain is finished, the de-identification service provision apparatus 100 configures a relational database using personal identification information, a one-way encrypted first time stamp string, and difference information between timestamps used in the respective hash chains (S215).

In this case, the relational database 152 can store personal identification information and a two-way encrypted first timestamp string mapped thereto, and can store difference information between timestamps used in the respective hash chains on the basis of the first timestamp string.

In this case, the difference information between timestamps used in respective hash chains, for example, may be configured as connection number data such as '2/3/3/4' by concatenating '2' obtained by subtracting the first timestamp string 1570520187 from the second timestamp string 1570520189, '3' obtained by subtracting the second timestamp string 1570520189 from the third timestamp string 1570520192, '3' obtained by subtracting the third timestamp string 1570520192 from the fourth timestamp string 1570520195, and '4' obtained by subtracting the fourth timestamp string 1570520195 from the fifth timestamp string 1570520199.

According to this configuration, pre-converted de-identification information can be equally extracted from information stored in the relational database 152 and a personal identification information inquiry service becomes possible by this process. This is described in more detail with reference to FIG. 9.

FIG. 9 is a flowchart illustrating a de-identification information inquiry operation of a de-identification service provision apparatus according to another embodiment of the present disclosure.

Referring to FIG. 9, the de-identification service provision apparatus 100 obtains a two-way encrypted first timestamp string and hash chain information in correspondence to personal identification information requested to be inquired (S301).

For example, when personal identification information requested to be inquired exists equally as 7902161555555 (or 7DDD138ABC hashed from it), the relational database 152 can search for and output the one-way encrypted first timestamp string 32VDSFSFSDF9877vD1 described above and connection number data such as '2/3/3/4' as hash chain information.

Further, the de-identification service provision apparatus 100 decrypts and concatenates the first timestamp string to the personal identification information requested to be inquired (S303), and performs a first hash chain one-way encrypting the concatenated string (S305).

As described above, the decrypted first timestamp string may be 1570520187 and a first hash chain of the de-identification service provision apparatus 100 can be performed by one-way encrypting the first connection string concatenated with the personal identification information requested to be inquired 7902161555555 (or 7DDD138ABC hashed from it).

Thereafter, the de-identification service provision apparatus 100 obtains a second timestamp string by separating a first difference value from hash chain information and adding the first difference value to the first timestamp string (S307).

Further, the de-identification service provision apparatus 100 performs a second hash chain performing one-way encryption by combining the second timestamp string with the result of the first hash chain (S309), and repeats a process of calculating an N-th timestamp string corresponding to an N-th hash chain from chain information, concatenating the N-th timestamp string to the result of an N−1-th hash chain, and performing one-way encryption until the hash chain is finished (S311).

In more detail, when the hash chain information is configured as connection number data such as '2/3/3/4', the de-identification service provision apparatus 100 separates number data of the hash chain information and sequentially sums the number data and a first timestamp string, whereby a timestamp string of each round of iterative hash chain can be obtained.

For example, a second timestamp string may be 157052189 obtained by adding 2 to 1570520187, a third timestamp string may be 157052192 obtained by adding 3 to 1570520189, a fourth timestamp string may be 157052195 obtained by adding 3 to 1570520192, and a fifth timestamp string may be 157052199 obtained by adding 4 to 1570520195.

Accordingly, the de-identification service provision apparatus 100 obtains a result of finishing an iterative hash chain and outputs it as pre-converted de-identification code information in correspondence to the personal identification information (S313).

When conversion result of de-identification code information is used, it is possible to identify specific users and provide a history inquiry service based on the identification even using only a de-identification code, from which specific personal information is never inferred, and the relational database 152, and it is possible to provide a personal information protection service with improved security.

The methods according to an embodiment of the present disclosure described above may be made in programs for being executed in a computer. Further, the programs can be stored in computer-readable recording media, and a ROM, a RAM, a CD-ROM, a magnetic tape, a floppy disk, an optical data storage, etc. may be exemplified as the computer-readable recording media.

Further, the computer-readable recording mediums may be distributed to computer systems that are connected through a network and may keep and execute codes that can be divisionally read by computers. Further, functional programs, codes, and code segments for implementing the method may be easily inferred by programmers in the art.

Although exemplary embodiments of the present disclosure were illustrated and described above, the present disclosure is not limited to the specific exemplary embodiments and may be modified in various ways by those skilled in the art without departing from the scope of the present disclosure described in claims, and the modified examples should not be construed independently from the spirit of the scope of the present disclosure.

The invention claimed is:

1. An operation method of a de-identification service provision apparatus for management of personal identification information, the operation method comprising:

obtaining personal identification information corresponding to personal information comprising receiving the personal identification information one-way converted with a transmission period encrypted from the personal information from an institute server;

identifying a de-identification mode corresponding to the personal identification information;

performing iterative hash chain processing by the number of times determined in accordance with the de-identification mode in correspondence to the personal identification information, wherein the performing of iterative hash chain processing comprises repeatedly hashing the personal identification information or a string in which the personal identification information and a special string are combined by a preset number of repetitions in accordance with the de-identification mode;

configuring a relational database corresponding to the personal identification information using de-identification code information obtained as a result of the iterative hash chain processing; and replacing de-identification code information stored in the relational database with de-identification information of the personal identification information and providing the de-identification information to a target network.

2. The operation method of claim 1, wherein the obtaining of personal identification information comprises:

decrypting a transmission period for the received personal identification information, and the providing the de-identification information to a blockchain network comprises:

replacing the personal identification information transmitted from the institute server with the de-identification code information and encrypting a transmission period; and propagating the transmission period-encrypted de-identification information to a blockchain network connected with the institute server.

3. The operation method of claim 1, wherein the de-identification mode comprises a first mode that calculates the number of repetitions of the iterative hash chain processing on the basis of string information of the personal identification information.

4. The operation method of claim 3, wherein the performing of iterative hash chain processing comprises:

extracting and concatenating numeric values of a string of the personal identification information when the de-identification mode is identified as the first mode;

summing a first number and a last number of the concatenated string; and calculating a unit digit of the summed value as the number of repetitions.

5. The operation method of claim 1, wherein the de-identification mode comprises a second mode that calculates the number of repetitions of the iterative hash chain processing using a timestamp corresponding to the personal identification information as a random seed.

6. The operation method of claim 5, wherein the performing of iterative hash chain processing comprises:

creating a timestamp corresponding to the personal identification information when the de-identification mode is identified as the second mode; and determining a random value determined within a predetermined range as the number of repetitions of the iterative hash chain processing using the timestamp as a seed.

7. The operation method of claim 1, wherein the de-identification mode comprises a third mode that calculates the number of repetitions of the iterative hash chain processing using a string of a timestamp corresponding to the personal identification information.

8. The operation method of claim 7, wherein the performing of iterative hash chain processing comprises:

extracting a timestamp string corresponding to the personal identification information when the de-identification mode is identified as the third mode;

combining a last digit number obtained from the timestamp string with the personal identification information; and performing the iterative hash chain processing by a preset number of times using the personal identification information combined with the last digit number.

9. A de-identification service provision apparatus comprising:

a personal identification information collector-processor configured to obtain personal identification information corresponding to personal information, wherein the personal identification information collector-processor receives the personal identification information one-way converted with a transmission period encrypted from the personal information from an institute server through a communication module;

an iterative hash chain processor configured to identify a de-identification mode corresponding to the personal identification information and perform iterative hash chain processing by the number of times determined in accordance with the de-identification mode in correspondence to the personal identification information, wherein the iterative hash chain processor repeatedly hashes the personal identification information or a string in which the personal identification information and a special string are combined by a preset number of repetitions in accordance with the de-identification mode;

a database manager configured to configure a relational database corresponding to the personal identification information using de-identification code information obtained as a result of the iterative hash chain processing; and a service processor configured to replace de-identification code information stored in the relational database with de-identification information of the personal identification information, and provide the de-identification information to a target network.

10. The de-identification service provision apparatus of claim 9, wherein the service processor replaces the personal identification information transmitted from the institute server with the de-identification information, encrypts a transmission period, and propagates the transmission period-encrypted de-identification information to a blockchain network connected with the institute server through the communication module.

11. The de-identification service provision apparatus of claim 9, wherein the de-identification mode comprises at least one of a first mode that calculates the number of repetitions of the iterative hash chain processing on the basis string information of the personal identification information, a second mode that calculates the number of repetitions of the iterative hash chain processing using a timestamp corresponding to the personal identification information as a random seed, and a third mode that calculates the number of repetitions of the iterative hash chain processing using a string of a timestamp corresponding to the personal identification information.

12. The de-identification service provision apparatus of claim 11, wherein when the de-identification mode is identified as the first mode, the iterative hash chain processor extracts and concatenates numeric values of a string of the personal identification information, sums a first number and a last number of the concatenated string, and calculates a units digit of the summed value as the number of repetitions.

13. The de-identification service provision apparatus of claim 11, wherein when the de-identification mode is identified as the second mode, the iterative hash chain processor creates a timestamp corresponding to the personal identification information and determines a random value determined within a predetermined range as the number of repetitions of the iterative hash chain processing using the timestamp as a seed.

14. The de-identification service provision apparatus of claim 11, wherein when the de-identification mode is identified as the third mode, the iterative hash chain processor extracts a timestamp string corresponding to the personal identification information, combines a last digit number obtained from the timestamp string with the personal identification information, and performs the iterative hash chain processing by a preset number of times using the personal identification information combined with the last digit number.

15. Non-transitory computer-readable storage medium, configured to store instructions which when executed perform the following operations:

obtain a hash chain value for iterative hash chain processing from personally identifiable information;

two-way encrypt a first timestamp string;

perform a first hash chain of one-way encrypting a first connection string composed of the non-encrypted first timestamp string and the personally identifiable information;

performing a second hash chain of extracting a second timestamp string at a second time point corresponding to the second hash chain and of one-way encrypting a second connection string obtained by concatenating second timestamp string with a result of the first hash chain;

repeatedly perform a process of extracting an N-th timestamp string at an N-th time point corresponding to an N-th hash chain that is a next of the second hash chain, of concatenating the N-th timestamp string to a result of an N−1-th hash chain, performing one-way encryption, and of increasing N by 1 until the number of repetitions calculated on the basis of the hash chain value is reached;

output de-identified code information obtained as the number of repetitions is reached; and configure a relational database using the personally identifiable information, the two-way encrypted first timestamp string, and difference information between timestamps.

16. The non-transitory computer-readable storage medium of claim 15, wherein the instructions, when executed, are further configured to:

obtain a two-way encrypted first timestamp string and difference information between timestamps from the relational database in correspondence to personally identifiable information requested to be inquired from an external device;

perform a first hash chain of decrypting the two-way encrypted first timestamp string and of one-way encrypting a first string obtained by concatenating the two-way encrypted first timestamp string with the personally identifiable information requested to be inquired;

obtain a second timestamp string by separating a first difference value from the difference information of the timestamps and adding the first difference value to the first timestamp string;

perform a second hash chain of combining the second timestamp string with a result of the first hash chain and of performing one-way encryption;

repeatedly perform a process of calculating N-th timestamp string corresponding to an N-th hash chain that is a next of the second hash chain from the difference information of the timestamps, of concatenating the N-th timestamp string to a result of an N−1-th hash chain, performing one-way encryption, and increasing N by 1 until a hash chain determined in accordance with the difference information of the timestamps is finished; and output an iterative hash chain result according to repeated performance as pre-converted de-identification information in correspondence to the personally identifiable information.

\* \* \* \* \*